Aug. 23, 1949.  J. M. WALTER  2,479,653
MACHINE TOOL SLIDE BEARING
Filed April 12, 1945

INVENTOR.
John M. Walter
BY Allen & Allen
ATTORNEYS

Patented Aug. 23, 1949

2,479,653

UNITED STATES PATENT OFFICE 2,479,653

MACHINE TOOL SLIDE BEARING

John M. Walter, Cincinnati, Ohio, assignor to The G. A. Gray Company, Cincinnati, Ohio, a corporation of Ohio Application April 12, 1945, Serial No. 587,860

7 Claims. (Cl. 308—3)

My invention relates particularly to a structure which is employable in the accomplishing of the objects of my invention set forth in my application for Letters Patent Serial No. 510,701, filed November 17, 1943, now Patent No. 2,378,343.

In that application for patent was explained the importance in connection with metal planers of preventing the heat distortion of the moving tables by heat transfer from the slide bearings for the tables, more particularly in connection with high speed modern planers. Also in that application one modification concerned the use of laminated condensation product bars as a bearing surface. It is in connection with the latter feature which my present application is particularly concerned.

The object of my present invention is to provide a slide bearing surface which his usable in machine tools, which bearing surface is advantageous not only in diminishing the heat transfer from the bearing surface to the moving member, but also provides a long wearing and low friction surface. One of the objects is to so mount the bearing that it is permitted to expand and contract without shifting as a body, which was one of the features of my said former application for patent, but I accomplish this by means which is least likely to become loose and if it does become loose or becomes exposed by wear, is least likely to inflict any substantial damage. In mounting my slide bearing, to be more specific, I employ mounting pins which are of the same type material as the bearing plates themselves. In addition, one of my objects is to permit some bodily shifting movement, although slight, of the bearing plates, by imparting a partial resilience to the mounting pins.

In the drawings and the specification to follow, I have described an exemplary embodiment of my invention in order to illustrate one mode of practicing my invention and in the claims that follow, I set forth the novelty believed to be inherent therein.

In the drawings

I have indicated at 6 a metal member which may be assumed to be, for example, one of the sides of a V-shaped way on a planer table. 5 is a planer bed. The parts 5 and 6 could also be any metal surfaces which are to be provided with a bearing surface.

The slide bearing surface is made up for any large machine of a series of plates 7. Where there are a series of plates used in a single linear slide bearing, they are slightly spaced from each other to allow for expansion. The plates are set into grooves 3 in the metal member, being a fairly loose fit therein to allow for some sidewise expansion.

Figure 1:
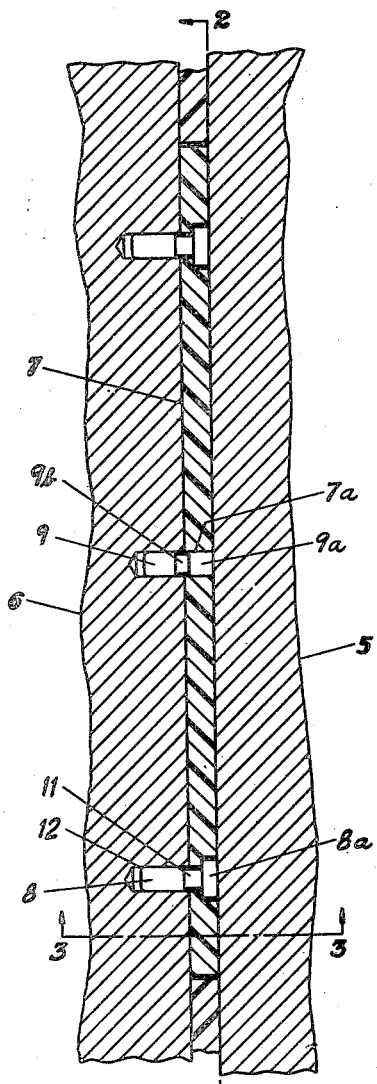
Figure 1 is a longitudinal central section of a slide bearing according to my invention.
Figure 2:
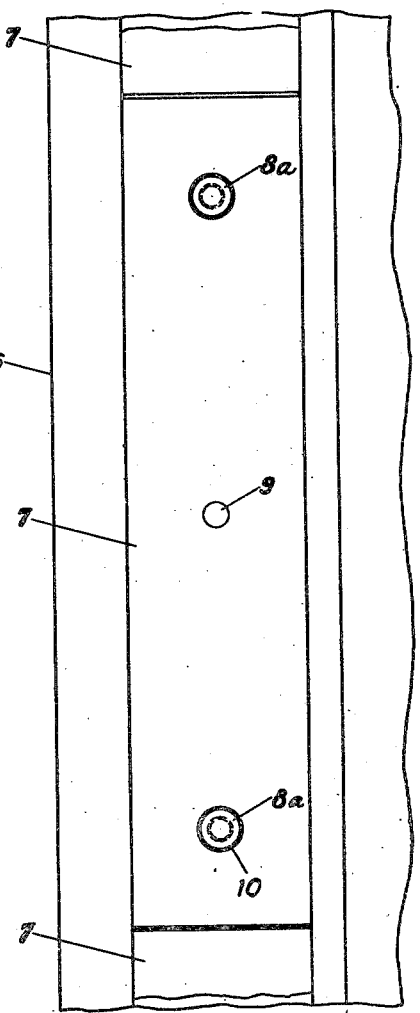
Figure 2 is a plan view of the slide bearing of my invention taken along lines 2—2 of Figure 1.
Figure 3:
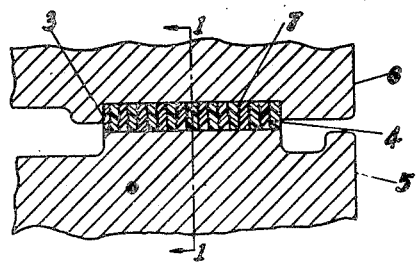
Figure 3 is a section on the line 3—3 of Figure 1.

The plates are formed of a resin saturated and cured laminated material, such as is produced by saturating sheets of fabric with a phenolic resin, placing them together in a pile and curing the mass under heat and pressure. The mass is then sawed into strips such that the fabric reenforcement runs normal to the bearing surface of the plates, and lengthwise of the bearing surface. This is indicated in Figure 3 by the vertical lines 4 indicating laminae.

It is desired to mount the plates so that they will not shift bodily lengthwise. This is done by means of pins 9. The pins are a drive fit into suitable holes in the base of the mounting channel in the metal member 6, and the heads 9a of the pins are a fairly tight fit into holes 7a in the resin laminated plates. In order to permit of some slight creeping of the plates under the stress of use, the necks 9b are formed in the pins which are smaller than the holes in the plates and the metal member and permit the pins to bend slightly, thus permitting some slight bodily shifting of the plates on the metal member.

For holding the plates in place, so as to permit expansion and contraction, I provide pins 8. These pins have heads 8a which fit loosely within countersinks 10 in the plates, and also have necks 11, which have some slight play in the holes below the countersinks in the plates. The pins are a drive fit into the holes 12 in the metal member.

As in the case of the median mounting pins, these pins 8 can bend slightly thus permitting a slight creep of the plates on the metal member, if the loose fit of the heads 10 and the upper portion of the shanks of these pins is taken up in one direction and bodily stress is imparted in that direction.

It will be noted that the tops of the heads of the several pins lie flush with the top surface of the plates themselves. When set in place the slide bearing is surface finished flush, pin heads and all. The pins are made of rods of laminated resinous material, such as are formed by saturating a piece of fabric and rolling it into a tight helix and then curing. Thus the "grain" of laminae of the pins is also normal to the slide bearing surface. If the surface wears the pins will wear similarly, and no metal parts as would be the case with metal pins or screws, are in danger of projecting from the bearing surface and marring the surfaces of the bearing.

By arranging the grain of the slide bearing as now described, differential wear or peeling is avoided and the slide bearings retain their surface for prolonged periods with normal lubrication.

No grooves for lubrication have been shown, although they will usually be provided. In this respect ordinary practices will be employed.

The special slide bearings as described will, in a planer, be mounted on both sides of the planer table V's. The fit of the plates themselves is not tight in any direction, expansion and contraction is allowed for and the mounting is such as to permit slight bodily movement although substantial movement which, in a series of plates for one bearing would cause one of them to push against its neighbor, is prevented by the central studs. The bearing surface takes a high finish and is uniform in its strength throughout due to the laminae being extended in the direction of the movement of the bearing surface or of a supported part against the surface, and being normal to the bearing surface. The mounting studs being of like material behave alike to the main plates themselves, and likewise have the laminae normal to the bearing surface.

Having thus described my invention, what I claim as new and desire to secure by Letters Patent is:

1. A slide bearing comprising at least one plate of laminated resinous material having the laminae thereof normal to the bearing surface thereof, and parallel to the direction of bearing movement, and mounting pins therefor also formed of laminated resinous material having the laminae thereof normal to the bearing surface.

2. A slide bearing comprising at least one plate of laminated resinous material having the laminae thereof normal to the bearing surface thereof, and parallel to the direction of bearing movement, and mounting pins therefor also formed of laminated resinous material having the laminae thereof normal to the bearing surface, the pins having narrowed necks thereon where they project from the plate into a mounting base therefor, which permits of slight bending of the pins.

3. A slide bearing comprising at least one plate of laminated resinous material having the laminae thereof normal to the bearing surface, and mounting pins therefor formed of laminated resinous material, said pins having narrowed necks thereon where they project from the plate into a mounting base therefor, which permits of slight bending of the pins.

4. A slide bearing comprising at least one plate of laminated resinous material having the laminae thereof normal to the bearing surface thereof, and parallel to the direction of bearing movement, and mounting pins therefor also formed of laminated resinous material having the laminae thereof normal to the bearing surface, at least one of said pins arranged to pass through the median portion of the plate with a tight fit and engage with a tight fit into a mounting base, and having a narrowed neck within the plate and projecting therefrom into the mounting base, which permits of slight bending of the pin.

5. A slide bearing comprising at least one plate of laminated resinous material having the laminae thereof normal to the bearing surface thereof, and parallel to the direction of bearing movement, and mounting pins therefor also formed of laminated resinous material having the laminae thereof normal to the bearing surface, said pins being arranged along the length of the plate and having their portions engaging the plate slightly smaller than the holes in the plate except for at least one pin adjacent the middle of the length of the plate which tightly engages its hole in the plate to prevent bodily lengthwise movement of the plate.

6. The combination of claim 5 in which the pin adjacent the middle of the length of the plate has a narrowed neck at that portion which projects through the inner end of the hole therefor in the plate and into the hole therefor in a mounting for said plate, thus permitting within the dimensional difference in the neck a slight movement bodily of the plate.

7. The combination of claim 5 in which all of the pins have narrowed necks thereon where they project from the plate into a mounting base therefor which permits of a slight bending of the pins and to that extent a slight bodily movement of the plate.

JOHN M. WALTER.

REFERENCES CITED

The following references are of record in the file of this patent:

UNITED STATES PATENTS

| Number | Name | Date |
|---|---|---|
| 821,690 | Widmer | May 29, 1906 |
| 2,310,053 | Bastian | Feb. 2, 1943 |
| 2,378,343 | Walter | June 12, 1945 |